US008578091B2

(12) United States Patent
Thomas et al.

(10) Patent No.: US 8,578,091 B2
(45) Date of Patent: Nov. 5, 2013

(54) PROVIDING DATA REDUNDANCY USING AN INTERNAL MASS STORAGE DEVICE AND AN EXTERNAL MASS STORAGE DEVICE

(75) Inventors: Fred Charles Thomas, Fort Collins, CO (US); Paul A. Boerger, Loveland, CO (US); Matthew D. Haines, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 12/484,499

(22) Filed: Jun. 15, 2009

(65) Prior Publication Data
US 2010/0318737 A1 Dec. 16, 2010

(51) Int. Cl.
*G06F 7/00* (2006.01)
*G06F 13/12* (2006.01)
*G06F 13/20* (2006.01)
*G06F 12/00* (2006.01)

(52) U.S. Cl.
USPC ............. 711/114; 707/650; 710/62; 710/313; 711/161; 711/162

(58) Field of Classification Search
USPC ............. 711/114, 161, 162; 707/650; 710/62, 710/313
See application file for complete search history.

(56) References Cited

U.S. PATENT DOCUMENTS

| | | | |
|---|---|---|---|
| 6,543,004 B1 * | 4/2003 | Cagle et al. ..................... 714/15 |
| 2006/0248294 A1 * | 11/2006 | Nedved et al. ................. 711/162 |
| 2007/0010986 A1 * | 1/2007 | Hong et al. ..................... 703/24 |
| 2008/0270797 A1 * | 10/2008 | Thomas et al. ................ 713/171 |
| 2009/0193524 A1 * | 7/2009 | Shoji et al. ........................ 726/27 |
| 2009/0282180 A1 * | 11/2009 | Kuan ............................ 710/302 |
| 2010/0281213 A1 * | 11/2010 | Smith et al. .................... 711/114 |
| 2010/0292982 A1 * | 11/2010 | Dube et al. ........................ 703/24 |
| 2011/0107040 A1 * | 5/2011 | Hanes ........................... 711/154 |

OTHER PUBLICATIONS

HP MediaSmart Server Catalog, 2008, pp. 1-11.
HP MediaSmart Server LX195 product advertisement (2 pages) dated on or before May 20, 2009.
HP MediaSmart Server User's Guide, pp. 1-230 dated on or before May 20, 2009.
Windows Home Server from Wikipedia dated on or before May 19, 2009 (6 pages).
Disaster Recovery Journal, Network Data Mirroring: Delivers Wide-Area Protection Augments Tape Backup and RAID Devices by Jason Welco, www.drj.com/articles/Win98/welco.htm (Jan. 1998) (5 pages).

* cited by examiner

*Primary Examiner* — Manorama Padmanabhan
*Assistant Examiner* — Mehdi Namazi

(57) ABSTRACT

A computer includes an enclosure, an internal mass storage device within the enclosure, and a redundancy controller within the enclosure. At least one port enables direct connection of the computer to at least one external mass storage device. The redundancy controller is configured to provide data redundancy using the internal mass storage device and the at least one external storage device if the at least one external mass storage device is connected to the at least one port.

15 Claims, 3 Drawing Sheets

PROVIDING DATA REDUNDANCY USING AN INTERNAL MASS STORAGE DEVICE AND AN EXTERNAL MASS STORAGE DEVICE

BACKGROUND

A computer, such as a desktop computer, a server computer, a notebook computer, or other type of electronic device, includes various electronic components, including a processor, storage device, and so forth. With certain types of computers, especially those targeted for sale to individual consumers, costs associated with the computers are an issue. For such computers, manufacturers often strive to configure the computers in a cost-effective manner, such as by reducing features or by incorporating less costly components into the computers.

An issue associated with such lower cost computers is that some features that may be desirable by a certain subset of consumers may not be available without performing relatively expensive reconfigurations or upgrades.

BRIEF DESCRIPTION OF THE DRAWINGS

Some embodiments of the invention are described with respect to the following figures.

DETAILED DESCRIPTION

Figure 1:
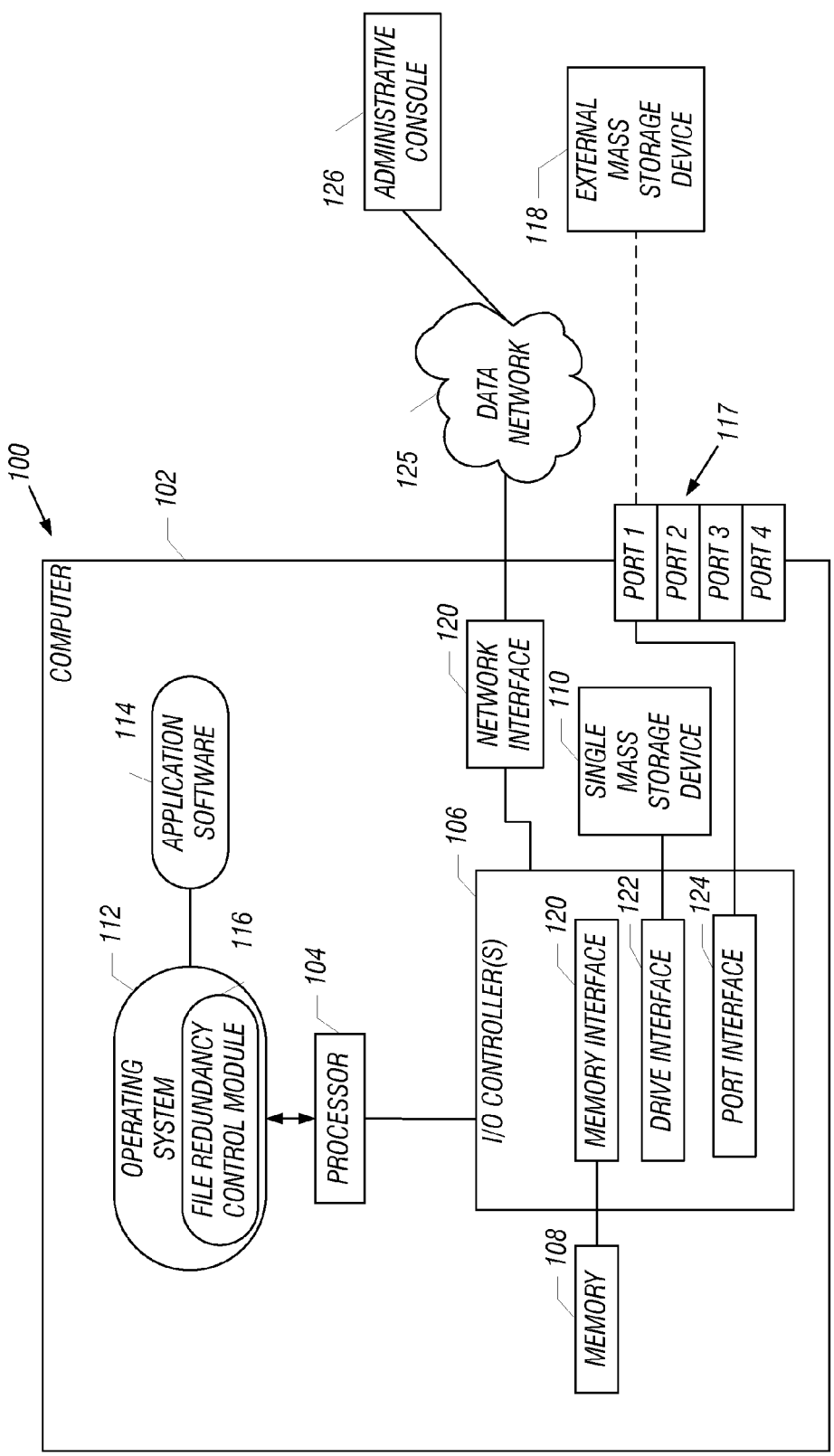
FIGS. 1 and 2 are block diagrams of exemplary computers that incorporate some embodiment of the invention.

In certain computers, a single mass storage device may be provided to achieve reduced costs. A "mass storage device" refers to any persistent storage device that is used to persistently store data of a computer. The mass storage device is separate and different from main memory and cache memory that may be present in the computer. The main memory and cache memory may be implemented with semiconductor or integrated circuit memory devices. On the other hand, a mass storage device can be a disk-based storage device (e.g., a hard disk drive) or other type of storage device with relatively large storage capacity. A "single" mass storage device refers to a storage device unit that is sold or otherwise provided as a singular component. For example, if the single mass storage device is a hard disk drive, then the single mass storage device includes a housing, a rotary disk inside the housing, and other associated components inside the housing. Note that in a different implementation, the single mass storage device can include multiple drive controllers and/or multiple disks within its housing.

In some cases, providing multiple mass storage devices inside a computer increases the cost of the computer, which may be undesirable to a computer manufacturer that sells computers to a cost-conscious customer base, such as individual consumers. While providing multiple mass storage devices within an enclosure of a computer allows for provision of redundancy to protect against failure of any one of the mass storage devices, the presence of the extra mass storage device(s) in the computer leads to increased costs that would force the computer manufacturer to charge a higher price for the computer, which may make the computer manufacturer uncompetitive in certain markets.

However, although providing just a single mass storage device in a computer may result in lower cost, such a single mass storage device computer may not be attractive to a subset of customers who desire availability of data redundancy provided by multiple mass storage devices. In accordance with some embodiments, to enhance flexibility in features that can be provided by computers that contain just a single mass storage device, a mechanism is provided in such computers to allow for additional external mass storage device(s) to be connected to the computers such that data redundancy can be implemented.

"Redundancy" or "data redundancy" refers to a protection technique in which extra information is stored to allow for the original data to be recovered in case of failure of a storage device (or any portion of the storage device). The extra information that can be stored to provide redundancy can be a copy of the original data. Copying the original data to provide redundancy is referred to as mirroring redundancy, in which a mirror copy of data is kept for the original data. Another type of redundancy is parity-based redundancy, in which the extra information includes parity information. The parity information allows original data to be reconstructed in case of failure or error of a part of the original data.

Examples of redundancy algorithms include the RAID (Redundant Array of Inexpensive Disks) algorithms, such as the RAID-1 algorithm, RAID-5 algorithm, or RAID-6 algorithm. The RAID-1 algorithm is an example of a mirroring redundancy algorithm in which data on a first mass storage device is copied to a second mass storage device, such that the original data is stored on the first mass storage device, while the mirror copy of the data is stored on the second mass storage device. The RAID-5 or RAID-6 algorithm provides parity-based redundancy, in which the original data is stored across a group of mass storage devices, and parity information associated with the original data is stored in another mass storage device.

Another redundancy algorithm is provided by the Drive Extender subsystem of the WINDOWS® Home Server operating system provided by Microsoft Corporation. The Drive Extender subsystem is a file-based replication subsystem that copies files on a first mass storage device to a second mass storage device to provide data redundancy.

As discussed above, providing just a single mass storage device within an enclosure of a computer prevents implementation of data redundancy that involves multiple mass storage devices. To enable the provision of data redundancy, one or more additional external mass storage devices are added, where the one or more external mass storage devices can be directly connected to one or more corresponding ports of the computer. "Directly" connecting an external mass storage device to a computer refers to a connection where the external mass storage device is able to communicate with the computer without having to pass data through any intermediate layer 3 router or layer 2 switch, such as those found in a data network. Layers 2 and 3 refer to layers defined by the Open Systems Interconnection (OSI) model, where layer 2 refers to a data link layer and layer 3 refers to a network layer. Direct connection of an external mass storage device to the computer can be achieved by using a cable to connect the external mass storage device to a port of the computer, or by connecting the external mass storage device through a hub that allows multiple external devices to connect to the port of the computer.

Once the external mass storage device(s) are directly connected to the computer, a redundancy controller within the enclosure of the computer is able to then provide data redundancy (such as by performing mirroring of data or generating parity information) using the single mass storage device within an enclosure and the one or more external mass storage devices.

In other embodiments, instead of providing just a single mass storage device within the enclosure of a computer, it is noted that the enclosure can contain a number of mass storage devices, where the number of mass storage devices is such that a target data redundancy cannot be implemented. For example, certain redundancy algorithms may involve use of more than two mass storage devices. Examples of such redundancy algorithms are the RAID-5 and RAID-6 algorithms. In a computer that has just two mass storage devices, implementation of a redundancy algorithm that involves more than two mass storage devices would not be possible using just the mass storage devices within the computer. In such a scenario, one or more external mass storage devices would have to be connected to respective port(s) of the computer.

Thus, generally, according to some embodiments, N mass storage devices (where N≥1) is (are) provided within an enclosure of a computer. With just the N storage device(s) within the enclosure of the computer, provision of a redundancy algorithm that involves more than N storage device(s) is not possible. In accordance with some embodiments, to enable provision of such a redundancy algorithm, M (M≥1) external mass storage device(s) is (are) added for connection to port(s) of the computer. In this way, a redundancy controller within the enclosure of the computer is able to provide data redundancy using the N storage device(s) within the enclosure of the computer and the M external mass storage device(s).

The data redundancy that is implemented with the N internal storage device(s) and M external mass storage device(s) involves storing original data on one or more of the N+M mass storage devices, and storing redundant data (e.g., mirror copy of the original data or parity information based on the original data) on other one(s) of the N+M mass storage devices.

FIG. 1 illustrates an exemplary arrangement that includes a computer 100 having an external housing 102 (represented by the rectangle shown in FIG. 1) that provides an enclosure of the computer 100. The housing 102 defines an internal space in which various components of the computer 100 are provided. The components include a processor 104, one or more input/output (I/O) controllers 106, main memory 108, and a single mass storage device 110. The computer 100 also includes various ports 117 (port 1, port 2, port 3, and port 4 shown in FIG. 1), that allows for connection to external devices.

The ports 117 can be one of various different types of ports. For example, the ports 117 can be Universal Serial Bus (USB) ports. Alternatively, at least one of the ports 117 can be an External Serial Advanced Technology Attachment (eSATA) port, where eSATA defines an external interface for data transfer with external mass storage devices. As yet another alternative, at least one of the ports 117 can be a Firewire port, where Firewire (or IEEE 1394) is a serial bus interface standard.

The computer 102 also includes software (which may initially be stored on the single mass storage device 110 or on some other storage device within the computer 100 or outside the computer 100). The software includes an operating system 112 that when loaded is executable on the processor 104. The software further includes application software 114.

In the embodiment of FIG. 1, the operating system 112 includes a file redundancy control module 116, which controls provision of data redundancy for the computer 100. If just a single mass storage device 110 is present in the computer 100, then the file redundancy control module 116 would not be able to provide data redundancy. However, in accordance with some embodiments, if an external mass storage device 118 is connected to a port (e.g., port 1) of the computer 100, then the file redundancy control module 116 would be able to implement data redundancy for the computer 100. In FIG. 1, the dashed line between the external mass storage device 118 and port 1 represents a cable or a combination of cables and an external hub.

In one example, mirroring redundancy is provided where the original data is stored on the single mass storage device 110 within the housing 102, while a mirror copy of the original data is stored in the external mass storage device 118. Alternatively, the original data can be kept in the external mass storage device 118, while the mirror copy of the data is stored in the mass storage device 110 within the housing 102.

In one implementation, the operating system 112 can be the Microsoft WINDOWS® Home Server operating system. The Home Server operating system provides a Drive Extender subsystem (represented by the file redundancy control module 116 in FIG. 1) that provides data redundancy implemented across multiple mass storage devices.

In alternative implementations, other types of operating systems can be employed. Also, other forms of data redundancy can be employed, such as the RAID algorithms.

Also, alternatively, instead of being provided in the operating system 112, the file redundancy control module 116 can be application software or other software external to the operating system 112.

The I/O controller(s) 106 in the computer 100 is used to allow the processor 104 to communicate with various other devices. In one implementation, the I/O controller(s) 106 can be implemented with a northbridge controller and a southbridge controller. The northbridge controller is also known as a memory controller hub or an integrated memory controller, and the northbridge controller typically handles communications among the processor 104, main memory 108, a graphics controller (not shown), and the southbridge controller. The southbridge controller is also known as an I/O controller hub or a peripheral controller hub, and the southbridge controller is used to control access to various I/O devices.

In other implementations, the I/O controller(s) can be implemented with other types of chipsets.

As shown in FIG. 1, the I/O controller(s) 106 includes a memory interface 120 that controls access of the memory 108, a drive interface 122 that controls access of the single mass storage device 110, and a port interface 124 that controls communications with the ports 117.

The I/O controller(s) 106 is also connected to a network interface 120 that allows the computer 100 to communicate over a data network 125 with network devices, including an administrative console 126 (which can be implemented with a computer). The data network 125 can be a local area network (LAN), a wide area network (WAN), the Internet, or other type of network.

In some embodiments, the computer 100 can be a headless server computer that does not have external connections to a user input devices (e.g., keyboard, mouse, etc.) or a display device (such as a large format display device). A large format display device is a display device having a resolution of greater than 720×480. To allow access of such a computer, the administrative console 126 is used to remotely access the computer 100 over the network 125. The administrative console 126 can be used by an administrator or other user to perform configuration of the computer 100 or to view various settings of the computer 100.

For example, the administrative console 126 can be used by a user to configure mass storage devices for the computer 100. The administrative console 126 can allow the user to determine that multiple mass storage devices are available to the computer, such as the single internal mass storage device 110 and the external mass storage device 118. The user can then perform configuration using the administrative console 126, such as by setting various fields or values, to activate data redundancy.

In a different embodiment, the computer 100 can be provided with user input devices and a display device to allow for configuration of the computer 100.

It is noted that in some embodiments, the computer 100 can be a media server that is connectable over the data network 125 with multiple other computers (referred to as "client computers"). The media server is able to perform various tasks. For example, the media server can control backup of data stored on the client computers. Data on the client computers are copied to the media server for backup purposes.

Alternatively, or in addition, the media server can also provide streaming of data. Streaming of data includes streaming audio and/or video data from the media server to one or more output devices (e.g., personal digital assistants, audio/video players, televisions, computers) over the network 125.

The provision of data backup and/or streaming can be provided by a module in the computer 100, such as the operating system 112.

Figure 2:
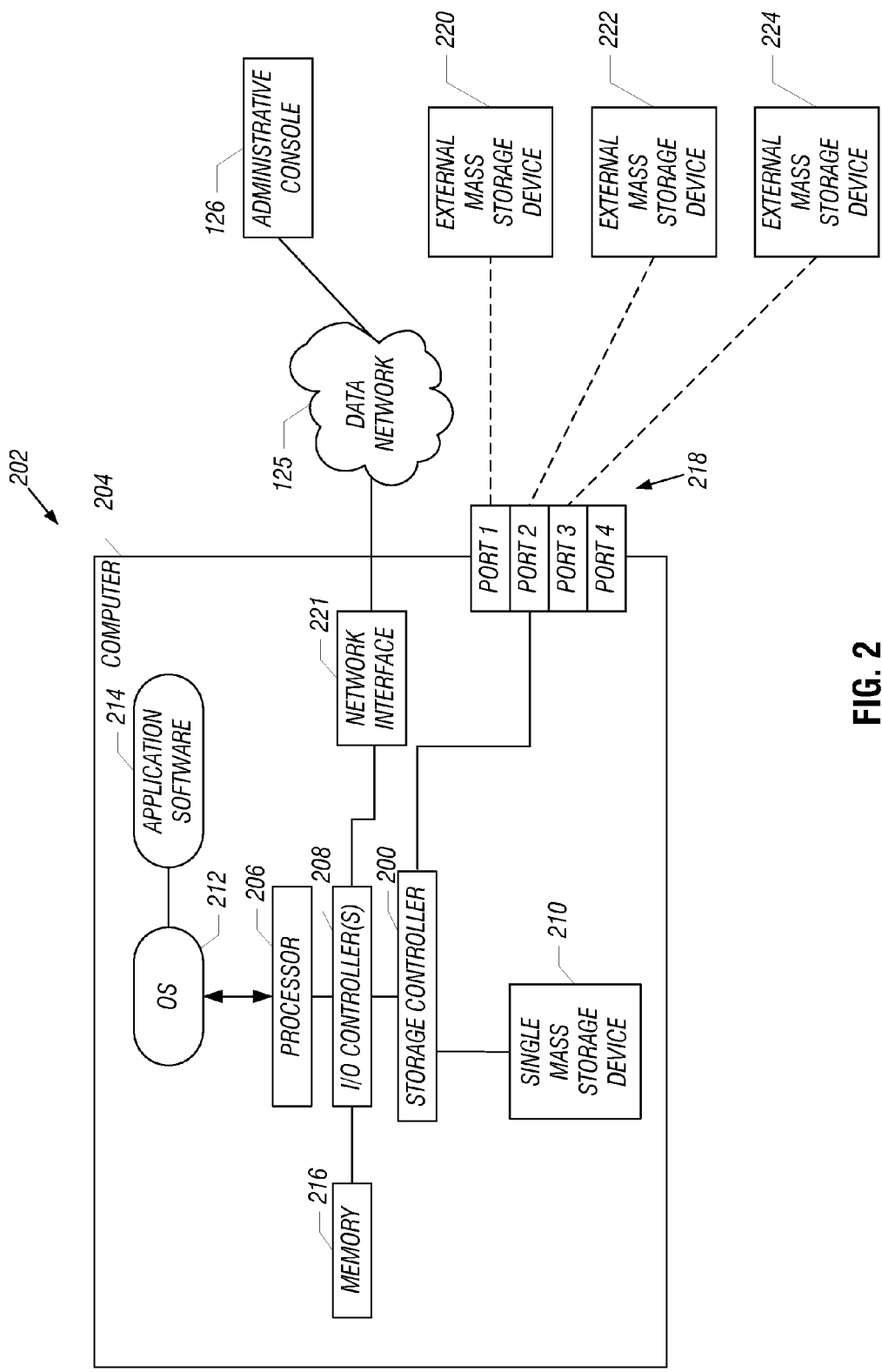

FIG. 2 illustrates a system according to another embodiment. In the FIG. 1 arrangement, data redundancy is provided by software (the file redundancy control module 116). However, in FIG. 2, data redundancy can be provided by hardware (or a combination of hardware and firmware), in the form of a storage controller 200. The storage controller 200 is part of a computer 202, which has a housing 204 that contains various components, including a processor 206, I/O controller(s) 208, a storage controller 200, and a single mass storage device 210. An operating system 212 and application software 214 are executable on the processor 206. The I/O controller(s) includes the appropriate interfaces (similar to corresponding interfaces in FIG. 1) to main memory 216 and ports 218. As shown in FIG. 2, multiple external mass storage devices 220 are connected to corresponding ports. The I/O controller(s) 208 is also connected to a network interface 221 to allow the computer 202 to communicate over a data network 125 with an administrative console 126.

The single mass storage device 210 within the housing 204 of the computer 202 and the external mass storage devices 220 are controlled by the storage controller 200 to implement a data redundancy algorithm, such as a RAID-5 or RAID-6 algorithm. If RAID-1 is employed (which is data mirroring), then the storage controller 200 would use just the single mass storage device 210 and one external mass storage device 220. However, it is also possible for the storage controller 200 to implement RAID-5 or RAID-6 using the single internal mass storage device 210 and multiple external mass storage devices 220, 222, 224.

Figure 3:
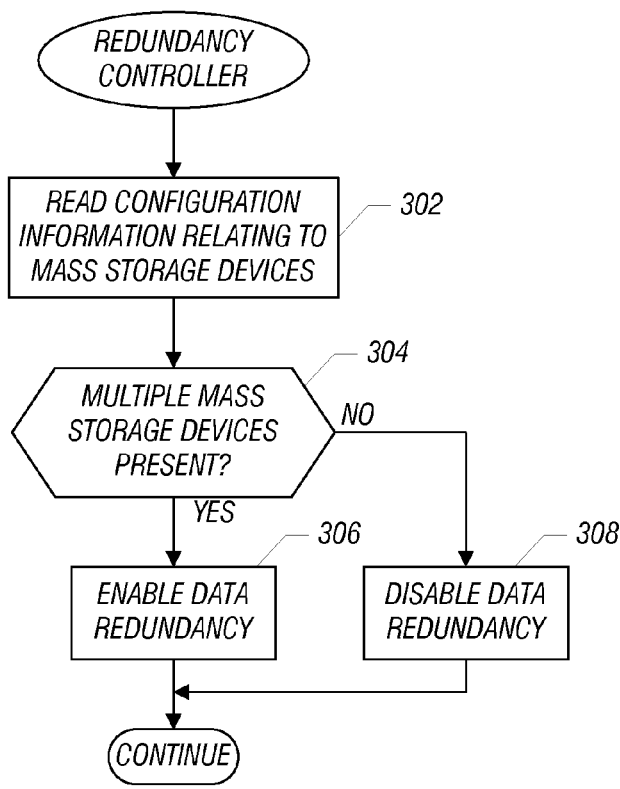
FIG. 3 is a flow diagram of a process performed by a redundancy controller according to an embodiment.

FIG. 3 is a flow diagram of a procedure performed by a redundancy controller according to an embodiment. The redundancy controller can be either the file redundancy control module 116 (FIG. 1) or the part of the storage controller 200 (FIG. 2) that implements data redundancy.

Upon startup, the redundancy controller reads (at 302) configuration information relating to the mass storage devices of a computer, such as computer 100 or 200 in FIG. 1 or 2. The configuration information can indicate which mass storage devices (both internal and external mass storage devices) are available to the computer. The redundancy controller determines (at 304) if multiple mass storage devices are present, including the internal mass storage device and at least one external mass storage device. If multiple mass storage devices are present, then the redundancy controller enables (at 306) data redundancy. On the other hand, if multiple mass storage devices are not present, then data redundancy is disabled (at 308).

In an alternative embodiment, instead of determining (at 304) just whether multiple mass storage devices are present, the redundancy controller can determine whether there are a sufficient number of mass storage devices to implement a desired data redundancy algorithm. The decision to enable or disable data redundancy can be based on whether there are a sufficient number of mass storage devices.

Figure 4:
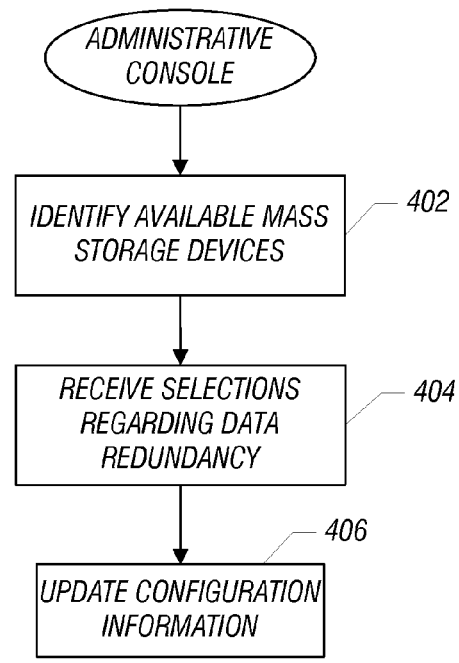
FIG. 4 is a flow diagram of a process performed by an administrative console according to an embodiment.

FIG. 4 illustrates a procedure performed by the administrative console 126 shown in FIG. 1 or 2. The administrative console 126, in response to user request, identifies (at 402) mass storage devices that are available at a computer 100 or 200. These available mass storage devices are presented to the user (such as by listing the available mass storage devices on a display of the administrative console 126 or by displaying the mass storage devices as icons). Based on the identified mass storage devices, the user is able to make selections or otherwise provide input providing data redundancy to be implemented at the computer 100 or 200. The administrative console 126 receives (at 404) such selections regarding data redundancy. Based on the received selections, configuration information relating to the mass storage devices is updated (at 406). The updated configuration information is stored at the computer 100 or 200, such that the configuration information can be used by the computer 100 or 200 for providing data redundancy.

Instructions of software described above (including the file redundancy control module 116 and other software of FIG. 1 or 2) are loaded for execution on a processor (such as processor 104 or 206 in FIG. 1 or 2). The processor includes microprocessors, microcontrollers, processor modules or subsystems (including one or more microprocessors or microcontrollers), or other control or computing devices. As used here, a "processor" can refer to a single component or to plural components (e.g., one or plural CPUs across one or plural computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A computer comprising:
   an enclosure;
   a group of internal mass storage devices within the enclosure, wherein the group of mass storage devices does not have a sufficient number of mass storage devices to implement a target data redundancy algorithm;
   a redundancy controller within the enclosure;
   at least one port to enable direct connection of the computer to at least one external mass storage device,
   wherein the redundancy controller is configured to provide data redundancy using the group of internal mass storage devices and the at least one external storage device if the at least one external mass storage device is connected to the at least one port, wherein connection of the at least one external mass storage device to the at least one port enables provision of the target data redundancy algorithm.

2. The computer of claim 1, wherein the data redundancy provided by the redundancy controller is one of RAID (Redundant Array of Inexpensive Disks) redundancy and WINDOWS® Home Server Drive Extender redundancy.

3. The computer of claim 1, wherein the computer is a headless computer without external connections to user input devices and a display device.

4. The computer of claim 1, wherein the redundancy controller is implemented with software.

5. The computer of claim 4, wherein the redundancy controller is part of an operating system of the computer.

6. The computer of claim 1, wherein the redundancy controller is part of a storage controller in the computer.

7. The computer of claim 1, wherein the at least one port comprises at least one port selected from the group consisting of a Universal Serial Bus (USB) port, an External Serial Advanced Technology Attachment (eSATA) port, and a Firewire port.

8. The computer of claim 1, further comprising:
   a module within the enclosure to control backup of data on devices connected to the computer over a data network, wherein the backup of data causes data on the devices to be copied to the computer.

9. The computer of claim 1, further comprising:
   a module within the enclosure to control streaming of data to one or more output devices over a data network.

10. A method of providing data redundancy implemented with plural mass storage devices, comprising:
    determining, in a computer, whether there are sufficient available mass storage devices to implement the data redundancy, wherein the computer includes a group of multiple internal mass storage devices within an enclosure of the computer, where the group of multiple internal mass storage devices does not have a sufficient number of mass storage devices to implement a target data redundancy algorithm, and wherein the determining includes detecting that at least one external mass storage device is directly connected to the computer, wherein connection of the at least one external mass storage device to the computer enables provision of the target data redundancy algorithm to perform the data redundancy; and
    implementing the data redundancy across the group of multiple internal mass storage devices and the at least one external mass storage device.

11. The method of claim 10, wherein implementing the data redundancy comprises storing original data in a first subset of the internal mass storage devices and the at least one external mass storage device, and storing redundancy information on another mass storage device outside the subset.

12. The method of claim 10, wherein determining whether there are sufficient available mass storage devices comprises accessing configuration information relating to mass storage devices available at the computer.

13. The method of claim 12, further comprising:
    receiving an update of the configuration information from a remote console that is connected over a data network to the computer.

14. An article comprising at least one non-transitory computer-readable storage medium containing instructions that upon execution by a computer cause the computer to:
    determine whether at least one external mass storage device is directly connected to the computer that has a group of multiple internal mass storage devices within an enclosure of the computer, where the group of multiple internal mass storage devices does not have a sufficient number of mass storage devices to implement a target data redundancy algorithm; and
    in response to determining that the at least one external mass storage device is directly connected to the computer, implement data redundancy across the at least one external mass storage device and the multiple internal mass storage devices, wherein connection of the at least one external mass storage device to the computer enables provision of the target data redundancy algorithm to perform the data redundancy.

15. The article of claim 14, wherein implementing the data redundancy across the at least one external mass storage device and the at least one internal mass storage device comprises storing original data in one or more of the external and internal mass storage devices and storing redundancy data on other one or more of the external and internal mass storage devices.

* * * * *